Sept. 10, 1968   J. R. READ ET AL   3,401,401
MULTIPLE PEN PLOTTER CARTRIDGE
Filed March 10, 1967   3 Sheets-Sheet 2
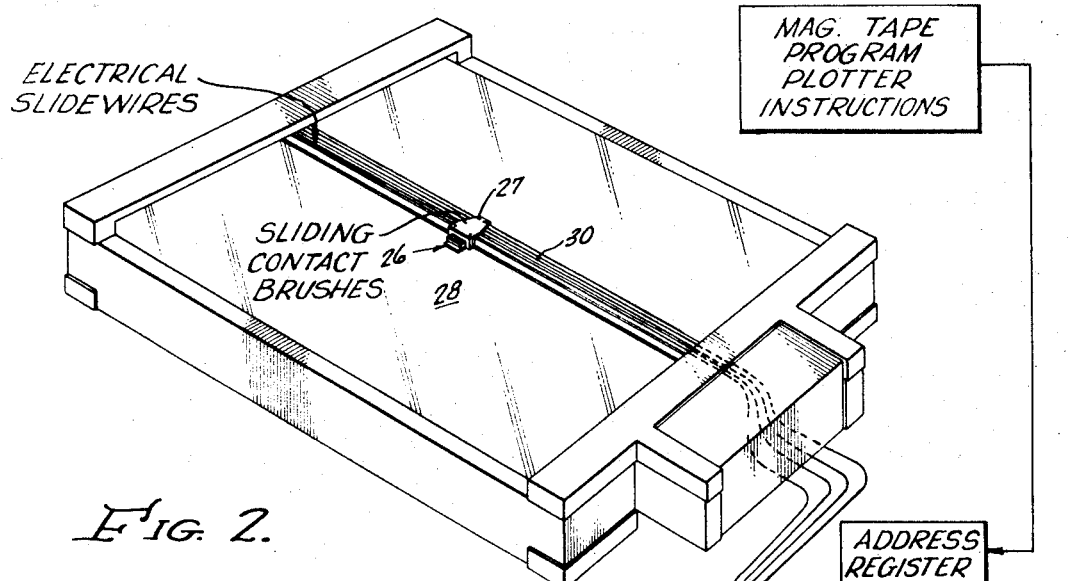
Fig. 2.
Fig. 3.
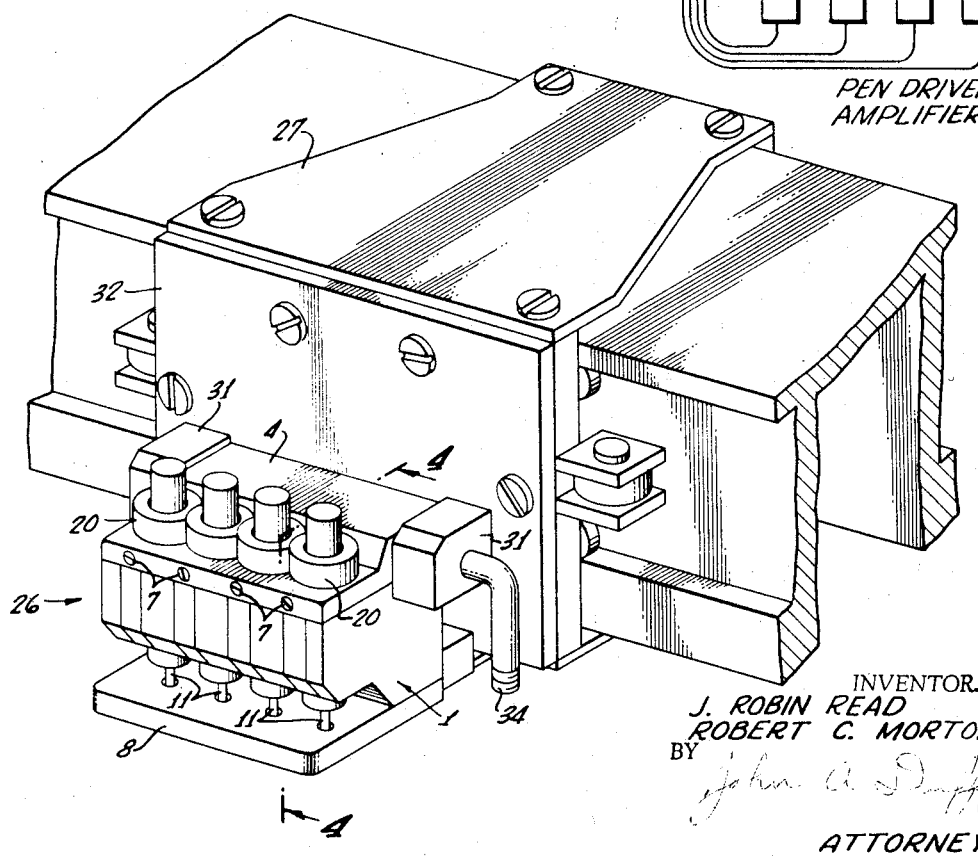
INVENTORS.
J. ROBIN READ
ROBERT C. MORTON
BY
ATTORNEY.

United States Patent Office 3,401,401
Patented Sept. 10, 1968

3,401,401
MULTIPLE PEN PLOTTER CARTRIDGE
Joseph Robin Read, La Mirada, and Robert C. Morton, Fullerton, Calif., assignors to California Computer Products, Inc., Anaheim, Calif., a corporation of California
Filed Mar. 10, 1967, Ser. No. 622,323
10 Claims. (Cl. 346—140)

ABSTRACT OF THE DISCLOSURE

The present invention relates to an apparatus for alternately selecting among several drawing pens having different styluses and colors and includes a plurality of electromagnets having adjacent pole faces with a pen assembly for each electromagnet. The electromagnets are selectively energized to bring a corresponding pen in contact with the platen of an incremental or analog plotter in response to external command signals.

Background

Incremental and analog plotting instruments are well-known in the art. Typically, such instruments have a single traveling pen which may be moved either withdrawn or in contact with a recording medium to produce a graphical display in response to external data commands. Such instruments may be operated to draft compositions in more than one color, although it is usually necessary to interrupt the plotting process after all the lines of one color have been drawn in order to manually change the pen color. The consequent loss of time for both man and machine in effectuating each color change is obviously undesirable.

Objects

Accordingly, it is an object of the present invention to provide a repertory of different colored pens in readiness for selection so that any pen or combination of pens may be brought into contact with the platen automatically in response to external data commands and without manual intervention.

It is another object of the invention to provide an assembly of cartridge and pens which can be quickly and easily attachable to, and removable from, standard plotter carriages.

It is a further object of the invention to maintain a constant pressure between the pen stylus and the recording medium during writing.

It is another object of the invention that the pens assume the deselected (no contact with plotter) position when power is removed.

It is another object of the invention to provide individual pen height adjustment in order to accommodate different pen styles and makes.

It is another object of the invention to provide a positioning reference for each pen which will allow the operator to begin the plot at a known set of coordinates.

Other objects and advantages of the present invention will become apparent to those skilled in the art from the following description of a particular embodiment of the invention wherein:

Brief description of drawings

FIGURE 2 illustrates the relationship of the cartridge to the platen when the cartridge is mounted on the plotter carriage;

FIGURE 3 illustrates how the cartridge attaches to the carriage; and

Summary of invention

In a principal application of the device of the invention, the multiple pen plotter cartridge is aligned and attached via guide pens and vice screws, respectively, to the movable element of a graphical recording instrument having a recording medium where it functions as a standby repository for drawing pens which may be selected singly or multiply upon application of external data commands. The cartridge consists of a laminated housing having a row of cylindrical holes for holding pen unit assemblies in readiness for selection. The laminates on each side of the cylinder holes are made of a high permeability material whereas the separating laminates (containing cylinder holes) are made of a low permeability material. The separating laminates contain recesses which are occupied by coils. Each coil may be energized by a separate external command to produce a field across the cylinder hole between the polarized high permeability laminates which function as pole faces. The magnetic field in the cylinder holes acts to exert a force upon a movable iron piston within the pen unit assembly. The piston is attached to a writing pen in a manner such that the force exerted by the magnetic field will move the piston to compress a spring within the pen assembly until the attached pen comes into contact with the recording medium.

Description of preferred embodiment

Figure 1:
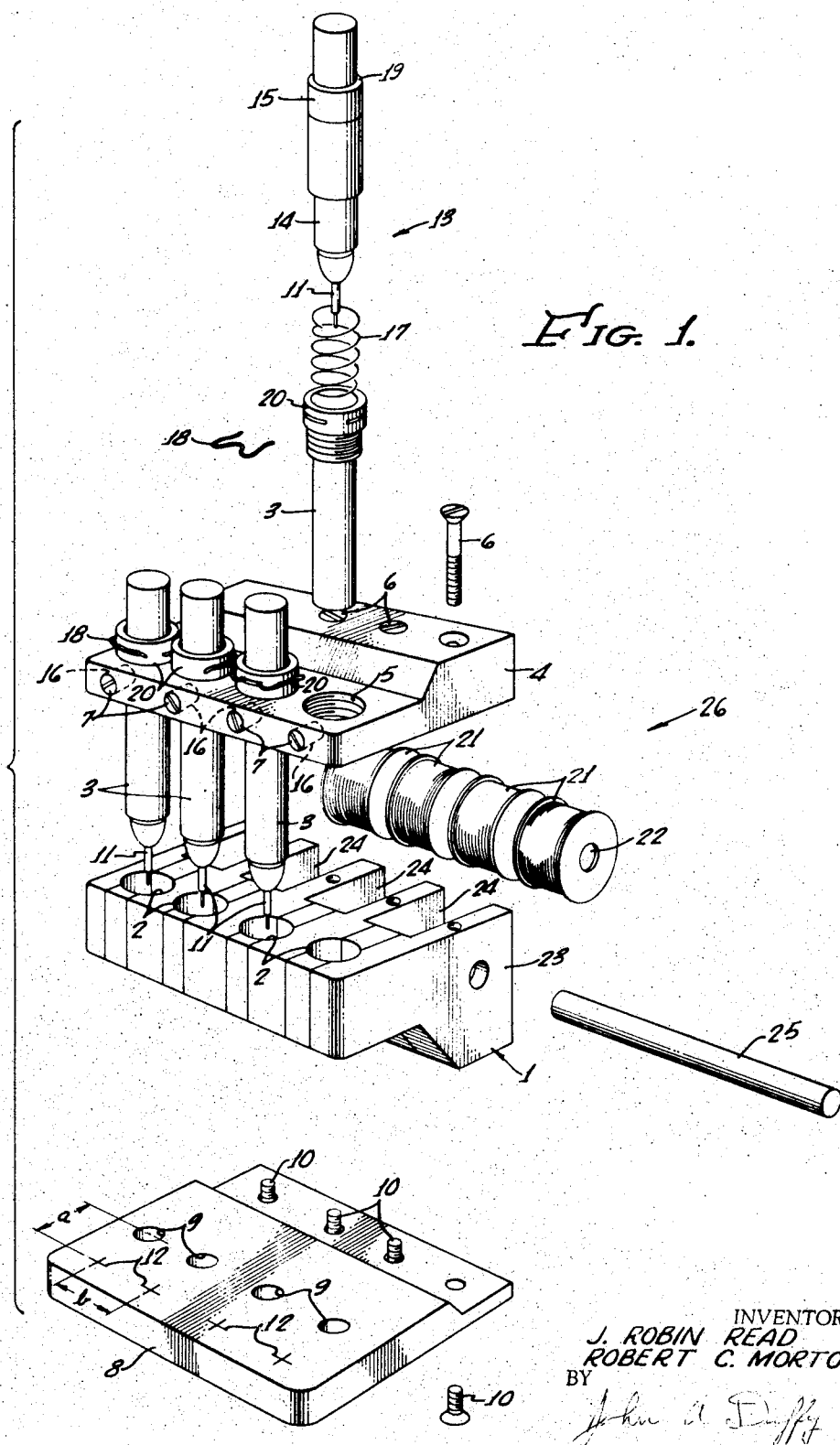
FIGURE 1 is an exploded view of one form of a functional structure embodying the salient features of the invention.

Adverting to FIGURE 1, an exploded view of one embodiment of the invention, the housing 1 consists of alternate laminations of iron (or other high permeability material) and aluminum (or other low permeability material) which are fastened together by any known means, e.g. rivets or bonding. Four holes 2 are centered in each of the aluminum laminations in order to accommodate four aluminum or other low permeability pen unit sleeves 3. An aluminum cover 4 having four tapped holes is secured to the housing 1 by screws 6 so that the tapped holes 5 in the cover are aligned with the holes 2 in the housing. The four pen sleeves 3 are threaded so that they may be screwed through the holes 5 and 2 in the cover and housing and locked at the desired position (height adjustment) by nylon set screws 7 which screw into holes 16 in the cover. A transparent Lucite pen guide 8 having four holes 9 concentric with the holes 5 in the cover 4 and holes 2 in the housing 1 is attached to the base of the housing 1 by the screws 10. The pen guide holes 9 serve to align the pen styluses 11 and accurately locate their centers. In addition, the pen guide serves to eliminate lateral forces which would be exerted on the pen during writing. The pen guide 8 also has reticles 12 for positioning the location of each pen. Each reticle 12 conissts of cross hairs located at an accurately measured distance directly in front of its associated pen. A pen assembly 13, composed of a non-magnetic pen unit 14 and a cylindrical iron piston 15 both having a diameter slightly smaller than that of the sleeves 3 so that the entire assembly 13 may freely slide within the sleeve 3, is held captivated within the sleeve 3 against a compression spring 17 by the detent spring 18 which locks in at the chamfered upper rim 19 through a slot in the sleeve 20. The other three pen assemblies (illustrated in place) are held in the sleeves in a like manner.

Each of the four actuating coils 21 is wound with approximately 2000 turns of the No. 36 AWG wire on a bobbin having a hole through its center 22. The five iron housing laminations also have holes concentric with the one illustrated in the end lamination 23 so that the actuating coils may be secured in the housing recesses 24 by a single iron mandrel 25.

With the assembled pen cartridge 26 appropriately amounted on the plotter carriage 27 as shown in FIGURE 2, the pens 13 are effectively held "up" by the compression springs 17 (see FIG. 1) so that none of the pens are in contact with platen 28. With the pens in this position the cylindrical iron piston 15 in the pen assembly 13 (see FIGURE 1) is positioned slightly above the center of the cylindrical holes 2 in the housing 1. The reason for this will be made clear when one considers the functional mechanics of pen selection as explained below.

A pen may be actuated to the "down" position so that it is in contact with the platen by supplying current to the appropriate coil. Assume, for example, that one of the coils 21 in FIGURE 1 is energized with a current so that the iron laminates on either side of the recess 24 for the coil become opposite pole faces of an electromagnet. The iron piston 15 in the pen asembly 13, being originally positioned slightly above the center of the pole faces, will experience a force downward by virtue of the magnetic field existing in the cylinder. This results from the basic principle of conservation of energy, e.g., the magnetic field energy stored in the cylinder must equal the amount of energy required to withdraw the piston from the cylinder. For a small distance of piston travel the magnitude of this force is:

$$F = \Delta E / \Delta S$$

where F is the force on the piston, E is the incremental change in energy in the cylinder, and S is the incremental distance of piston travel.

Figure 4:
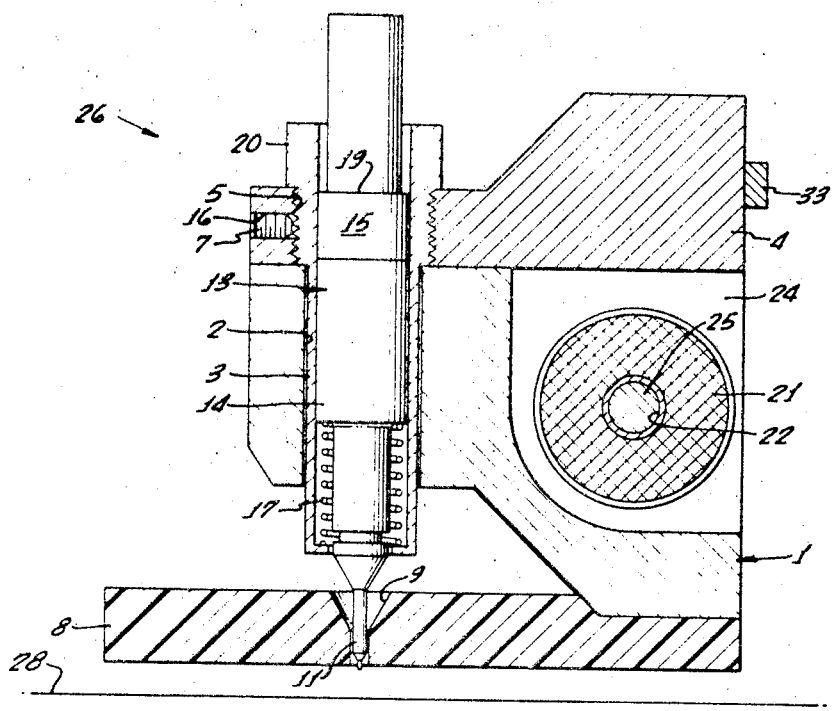
FIGURE 4 shows a cut-away section of the cartridge illustrating the relative position of the various operative elements in the deselected state.

When the pen cartridge 26 is appropriately located on the plotter carriage 27 as shown in FIGURE 3, the pen stylus 11 will contact the platen and remain in contact as long as the appropriate coil is energized. FIGURE 4 shows a cut-away view illustrating the relative positions of the operative elements in the pen assembly 13 when the pen is withdrawn. When the coil 21 is energized the magnetic force on the iron piston 15 must be sufficient to continually overcome the return force exerted by the compression spring 17 within the sleeve 3. In this state the pen will write as the beam 30 and the carriage 27 (FIGURE 2) move about their course. Upon removal of the coil current, the magnetic field will decay and allow the compression spring 17 to return the pen to the "up" or "rest" position as shown in FIGURE 4.

The manner of attaching the cartridge 26 to the carriage 27 is illustrated in FIGURE 3. The cartridge 26 is first positioned between the vice jaws 31 of an adapter plate 32 which is fastened to the carriage 27. The positioning alignment of the cartridge 26 relative to the adapter plate 32 is facilitated by guide pins 33 at the back of the top cover 4 (see FIGURE 4) which fit into accordant roles located on the adapter plate 43. The cartridge 26 is secured to the adapter 32 by tightening the vice screw 34 which pulls the jaws 31 snug against the ends of the top cover plate 4.

The plotting operation may be commenced at any given point by positioning the reticle 12 (see FIGURE 1) in the transparent pen guide directly above the point. By appropriately programming the plotter to account for the distance between the reticle and stylus (a) the beam 30 will move forward to the exact coordinate and commence plotting.

The required shift in the carriage position to accommodate pen changes may be programmed in a like manner. Thus, if adjacent pens are separated by a known distance (b) the carriage will be programmed to shift some multiple of (b) before any pen is brought into contact with the plotter. The appropriate pen selections can be accomplished by any one of numerous logic schemes.

The present invention may be utilized in conjunction with analog and incremental plotters, having either flat or rotary beds, facsimile reproduction devices, X-Y recorders, and in general with any apparatus which will be required to draft drawings, charts or graphs or compositions in varying color or line characteristics.

Although a four pen exemplary embodiment has been discussed in detail, it will be understood that numerous other applications of the invention are possible and that the embodiment disclosed may be subjected to various changes, modifications and substitutions without departing from the spirit of the invention.

We claim:
1. In a graphical recording system having a recording medium, a plurality of electromagnets having adjacent pole faces, each of said electromagnets comprising:
   a plurality of laminates of high magnetic permeability;
   a laminate of low magnetic permeability between each said high permeability laminate;
   a pen assembly for each electromagnet, each said magnet having a repository between opposite pole faces for holding said pen assembly, said repository being in said low magnetic permeability laminate between said high permeability laminates;
   means for selectively energizing said magnets to bring said pen assemblies in contact with said recording medium.

2. In a graphical recording system having a recording medium, a housing comprising:
   end laminates and alternate interior laminates of high magnetic permeability separated by alternate laminates having low magnetic permeability;
   a coil between each pair of said high permeability laminates, each said coil and said pair of high permeability laminates separated by said low permeability laminates comprising an electromagnet;
   a pen assembly for each said electromagnet;
   a repository between opposite pole faces of each said electromagnet for holding a corresponding pen assembly;
   means for selectively energizing said electromagnet to move said pen assemblies relative to said recording medium, said pen assembly being in contact with said recording medium when said associated electromagnet is energized.

3. In a visual recording system, a cartridge device for selecting among marking units comprising;
   a laminated housing having end laminates and alternate interior laminates of high magnetic permeability separated by alternate laminates having low magnetic permeability,
   said housing having a plurality of cylinder holes adapted to hold said marking units, each of said cylinder holes being parallel to each other and located midway between alternate high permeability laminations,
   means for magnetizing adjacent high permeability laminates to create a magnetic field within said cylinder holes,
   a marking unit assembly emplaced within each of said cylinder holes to be responsive to said magnetic field to cause said pen unit to be selected for writing.

4. The visual recording system recited in claim 3 wherein each said marking unit assembly comprises;
   a low permeability cylindrical sleeve,
   a high permeability cylindrical piston,
   a marking unit attached to said piston for writing,
   said piston to be placed inside of and longitudinally movable within said sleeve,
   a coil spring,
   means for retaining said coil spring within said sleeve, said coil spring to have its convolutions oriented longitudinally with respect to said sleeve, and
   means for retaining said piston within said sleeve to longitudinally compress said coil spring.

5. The visual recording system recited in claim 3 wherein is included an apparatus for attaching said cartridge device to a recording instrument comprising;

a mounting plate permanently attached to said recording instrument,
said mounting plate having a pair of vice jaws,
a vice screw for tightening said vice jaws, and
an aligning means for positioning said cartridge between said vice jaws for attachment.

6. The cartridge device described in claim 3, wherein is included;
means for operatively attaching said device to a graphical recording instrument for writing,
cross hair sighting means for positioning each of said pen units at a known coordinate before starting to draw,
programming means for making the appropriate position shifts of said recording instrument to account for each new pen unit selection.

7. In a graphical recording system, a cartridge device for selecting among marking units comprising;
means for attaching said cartridge device to a recording instrument having a recording medium, said cartridge device comprising,
a laminated housing having end laminates and alternate interior laminates of high magnetic permeability separated by alternate laminates having a low magnetic permeability,
said housing having a row of cylinder holes adapted to hold said marking units, each of said cylinder holes being parallel to each other and located midway between alternate high permeability laminations,
a marking unit assembly emplaced within each of said cylinder holes, each of said marking unit assemblies comprising,
a low permeability cylindrical sleeve, a high permeability cylindrical piston, a marking unit attached to said piston for writing, said piston to be placed inside of and longitudinally movable within said sleeve, a coil spring, means for retaining said coil spring within said sleeve, said coil spring to have its convolutions oriented longitudinally with respect to said sleeve, means for retaining said piston within said sleeve to longitudinally compress said coil spring,
electromagnetic means responsive to external data commands for selection of marking units, said electromagnetic means to be magnetically coupled to oppositely polarize the high permeability laminates of said housing located on each side of a marking unit or units to be selected so as to create a magnetic field between said laminates,
positioning means for adjusting and retaining said marking unit assembly within said cylinder holes, said marking unit assemblies to be positioned within said cylinder holes to have said movable piston responsive to said magnetic field whereby said magnetic field will urge said piston and marking unit against the retaining force of said coil spring until said marking device moves beyond said cylinder and sleeve into continuous contact with said recording medium during selection.

8. The cartridge device for selecting among marking units described in claim 7 wherein said means for attaching said cartridge device to said recording instrument comprise;
a mounting plate permanently attached to said apparatus, said mounting plate having a pair of vice jaws, a vice screw for tightening said vice jaws, an aligning means for positioning said cartridge between said vice jaws for attachment.

9. The cartridge device for selecting among marking units described in claim 7, wherein is included;
cross hair means for positioning each of said pen units at a known coordinate before starting,
programming means for making the appropriate positional shifts of said recording apparatus to account for each new pen unit selection.

10. In a graphical recording system having a recording medium, a plurality of pen unit assemblies, a cartridge device comprising:
a plurality of electromagnets having a repository between opposite poles faces of each electromagnet for individually holding each of said pen unit assemblies in readiness for selection;
means for operatively attaching said cartridge to a graphical recording instrument for writing;
means for energizing either separately or in combination said electromagnets in response to external data commands to create a magnetic field between said poles of energized electromagnets whereby the associated pen unit assemblies may be caused to be selected by being brought into contact with said recording medium;
cross hair sighting means for positioning each of said pen unit assemblies at a known coordinate before starting to draw; and
programming means for making the appropriate positional shifts of said recording system to account for each new pen unit selection.

References Cited
UNITED STATES PATENTS

| | | | |
|---|---|---|---|
| 2,659,652 | 11/1953 | Thompson | 346—50 |
| 2,936,207 | 5/1960 | Beaumont et al. | 346—29 |
| 3,223,029 | 12/1965 | Simshauser | 346—78 X |
| 3,340,541 | 9/1967 | Klassen et al. | 346—140 |

RICHARD B. WILKINSON, *Primary Examiner.*

J. W. HARTARY, *Assistant Examiner.*